Figure 1:
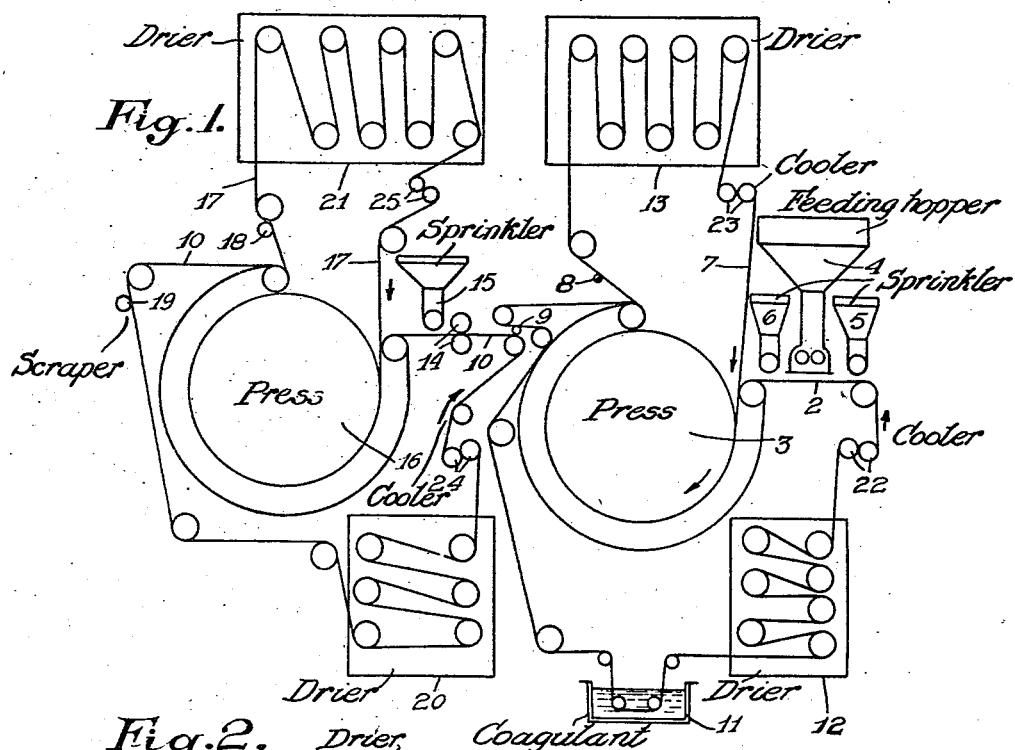

M. Van Roggen
L. Robin
INVENTORS

By Marks & Clerk
Attys.

Patented Sept. 1, 1936

2,052,909

UNITED STATES PATENT OFFICE 2,052,909

PROCESS OF DEHYDRATING COLLOID MATERIAL

Mathieu van Roggen, Sprimont, and Leo Robin, Brussels, Belgium

Application February 16, 1933, Serial No. 657,144
In France February 18, 1932

6 Claims. (Cl. 100—37)

The dehydration of colloid materials, e. g. peat, is attended by considerable practical difficulties due to the fact that water is retained in said materials in such close association therewith that it cannot be expelled therefrom by mere pressure. It is known, moreover, that the dehydration of such materials by pressure becomes possible if they can be divided into fragments, and such fragments be suitably sprinkled with a dry pulverulent material. In the case of raw peat, the dry pulverulent material thus added generally consists of powdered peat.

However, the practical application of the aforesaid dehydrating process suffers from disadvantages usually arising from a lack of consistency in the material to be treated preventing such material from being divided positively, from difficulties in coating pieces of muddy consistency with a dry powder, and from the natural tendency displayed by said materials of muddy consistency to amalgamate homogeneously with any dry pulverulent material added thereto. Furthermore, since the material to be treated frequently contains an excess of free liquid, the dry pulverulent material becomes moistened by mere contact with the same and thus loses the greater part of its value. As a result, it becomes necessary to use dry pulverulent material in such large quantities that the manipulation and drying of the same jeopardize the commercial value of the process.

It is the object of our invention to obviate the aforesaid disadvantages and difficulties.

According to our invention, the material to be treated is compressed in contact with one or more permeable and absorptive bands, i. e. bands maintained in such condition that they are adapted, during the whole of the period of compression, to become moistened in the liquid to be expelled. To this end, the band or bands are separated from the material undergoing treatment before they have become saturated with moisture, and they are only brought back into contact with said material after having been sufficiently dried to be fitted for use as efficient dehydrating agents once more.

The permeable and absorptive bands used according to our invention may consist of any suitable fibrous textile material such as cotton, flax, hemp, jute, wool, cocoa-fibre or the like, i. e. any fibrous tissue insoluble in the liquid to be expressed but adapted to be moistened thereby. It has been found that the power of a colloid material to retain liquid is lessened when said material is placed in contact with a band of the class aforesaid, that upon being subjected to pressure said material exudes a quantity of liquid considerably in excess of that which the band is adapted to absorb, and that the permeable and absorptive band has, to say, the power to initiate an abundant exudation of liquid.

The permeable and absorptive band or bands may be charged with materials, such as dry pulverulent peat for example, adapted to lessen the power of the colloid material to retain liquid, or with substances such as coagulants or electrolytes, adapted to promote the coagulation of the colloid material. It is likewise preferable to make use of a band or bands whereof the material has been treated with a tanning agent such as a bichromate, for example, since bands thus prepared promote coagulation of the material undergoing treatment and are better adapted to withstand rotting.

The use of permeable and absorptive bands according to our invention offers important advantages over that of noncohesive substances such as pulverulent peat or saline layers. Such bands are suitable for the treatment of colloid materials of any degree of consistency, the absorptive material of which they are constituted may be separated positively from the material undergoing treatment after having become moistened, the absorptive power of said belts may be fully renewed by appropriate drying, and said belts may likewise be used as conveyors to carry the colloid material into and through the press.

The use of permeable and absorptive belts according to our invention may be combined with the usual process involving the action of pulverulent material. Such a combination of processes may, for example, take the form of removing a first quantity of liquid from the colloid material by means of one or more bands, and thereupon completing dehydration by means of pulverulent dry material, or by the combined use of a band according to the invention and of pulverulent dry material.

The dehydrating installation according to our invention comprises essentially a band travelling into and through a press together with the material to be treated, said band passing thereafter in contact with scrapers adapted to detach said material therefrom after treatment thereof, and through a drying device or chamber adapted to restore to said band its absorptive power. Upon emerging from the drying device or chamber, the band is preferably caused to travel through a cooling device or chamber, since the treatment is most effective when applied cold, the material of the band being liable to absorb liquid too quickly.

if it is at a higher temperature than the material undergoing treatment.

If desired, an installation of the class described may conveniently be associated with devices adapted to divide the material to be treated, and to sprinkle the same.

Figure 2:
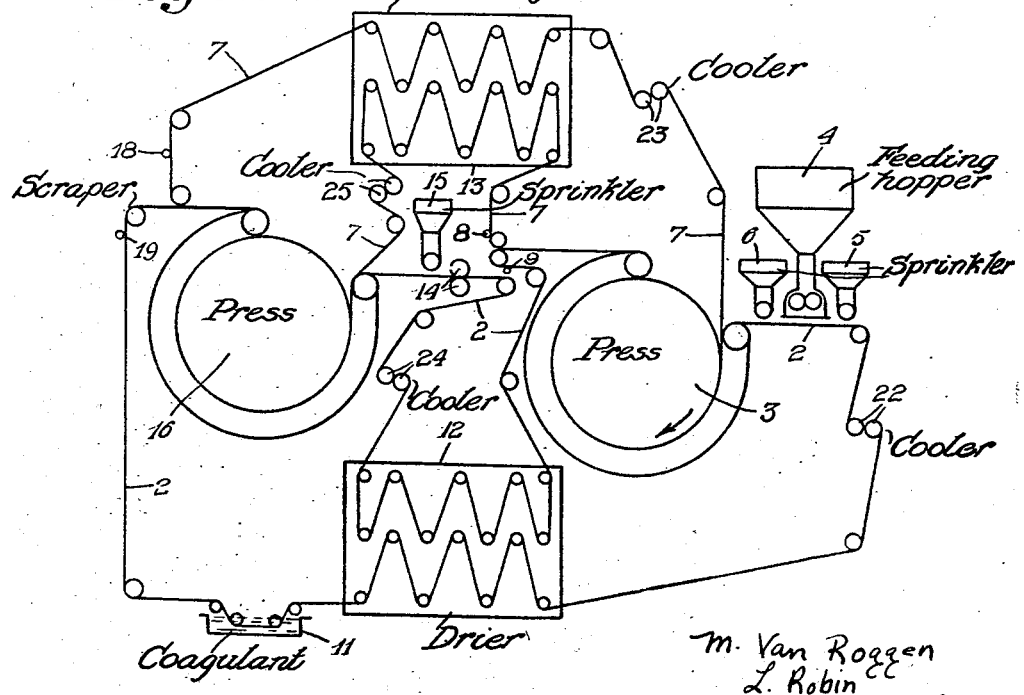

Further details and features of our invention will become apparent from the appended description taken in conjunction with the accompanying drawing, showing diagrammatically, by way of example, two constructional embodiments thereof. In said drawing:

Fig. 1 shows an installation wherein a separate set of bands or belts is used for each press, Fig. 2 illustrates an installation wherein one same set of belts or bands passes through both presses in succession.

Like reference numerals apply to similar members in each of the figures.

Fig. 1 illustrates a plant comprising an endless belt 2, adapted to convey into and through a press 3 a relatively thin layer of material, e. g. peat. Belt 2 may be made of cotton, flax, hemp, jute, wool, cocoa-fibre or the like, i. e. of any fibrous material insoluble in the liquid to be expressed but adapted to become moistened thereby.

The material to be treated is loaded directly upon belt 2 by means of a hopper feeding apparatus 4, adapted to divide said material into small pieces. The feeding and dividing apparatus 4 is located in the line of travel of belt 2, between two powder-sprinkling devices 5, 6 fitted in front of and behind said apparatus 4, respectively. Upon entering the press 3, the peat is compressed between belt 2 and a similarly constituted belt 7, whereby free liquid is readily expressed from the peat together with such further water as may be expelled under slight pressure.

The water thus expelled passes through the permeable belts 2, 7, together with that exuded in consequence of the reduction of the power of the treated material to retain liquid, resulting from contact with and pressure from said belts.

Belts 2 and 7 are preferably charged with substances adapted per se to promote the coagulation of peat or to reduce its retentive power relatively to the liquid to be expressed. In particular, it is advantageous to make said belts of a tanned material, for example fibrous vegetable material tanned by treatment with an alkaline bichromate.

Upon emerging from press 3, belt 7 passes in contact with a scraper 8 adapted to cause any material clinging to belt 7 to drop onto belt 2. Belt 2 likewise passes in contact with a scraper 9, adapted to cause the material to drop onto a belt 10. Belt 2 then travels through a container 11 wherein it becomes charged with substances adapted to promote the coagulation of peat or to lessen the power of the same to retain water. Container 11 may be filled with an electrolyte, for example.

Belt 2 then passes through a drying device or chamber 12. It is desirable that the belt which receives the material to be treated be cold and to this end, belt 2 is caused to travel through a cooling device 22. Belt 7 is likewise caused to travel through a drying device 13 and through a cooling device 23, similar to devices 12 and 22, respectively.

The belt 10, similar to belt 2, is caused to travel together with the material loaded thereupon between crimping rollers 14 adapted to shape said material into small blocks. Before the layer of material thus crimped or shaped into blocks enters a second press 16, it may be strewn with dry powdered peat by means of a sprinkling device 15. Whilst the material is in press 16, it is subjected to compression between belt 10 and a belt 17, similar to belt 7.

Upon emerging from press 16, the belts 17 and 10 pass in contact with scrapers 18, 19, similar to scrapers 8, 9, respectively, through drying devices or chambers 20, 21, similar to the corresponding devices 12, 13, and through cooling devices 24, 25, similar to the corresponding devices 22, 23.

After travelling through the various devices above recited, the belts 2, 7, 10, and 17 are led back into contact with the material under treatment, in order to act thereupon by virtue of their particular constitution and, where sprinkling devices are provided, because they have been charged with dry powdered peat.

In most cases the powder sprinkling devices situated in front of the first press may be omitted, and sometimes those placed before the entrance to the second press may be omitted likewise. In such cases the material is preferably fed directly into the presses, the feeding and dividing apparatus 4 preceding the first press and the crimping rollers 14, located in front of the entrance to the second press, being omitted. In some cases, a set of devices such as 4, 5 and 6 may be mounted in front of the entrance to the second press 16.

Should the initial condition of the colloid material be suitable, use may of course be made of a single press instead of several presses in succession.

Fig. 2 illustrates an installation wherein belts 2, 7 travel through the first press 3 and likewise through the second press 16. The belts must be dried after emerging from the first press and before entering the second press. To this end, use is made of drying devices or chambers 12, 13, which may likewise be adapted to dry said belts between their issue from the second press and their re-entry into the first press.

In the constructional embodiments illustrated in Figs. 1 and 2, it is not of course essential that all the belts be absorptive of the liquid to be expressed during the period of compressing. For example, the belts 7 and 17 may be constituted in this manner whilst other belts, such as 2 and 10, may be made of india rubber or the like, to act merely as impermeable conveyors. In this case, the impermeable belts such as 2 and 10 need not travel through drying devices or chambers.

It is likewise clear that all the belts such as 2, 7, 10, and 17, made of a material absorptive of the liquid to be expressed during the period of compression, may be charged with a substance adapted to promote the coagulation of the material undergoing treatment or to reduce its power to retain the liquid to be expelled.

Our invention is not limited to the constructional embodiments herein illustrated by way of example, and various modifications may be made in the shape, arrangement and constitution of the various members, without departure from its principle and scope as defined by the appended claims.

We claim:

1. In a process of dehydrating colloid material, continuously bringing crude colloid material into contact with an endless band adapted to absorb moisture, continuously moving said band with the material in contact therewith, applying pressure to said band to initiate the exudation of liquid from the material in contact therewith, increasing said pressure to cause liquid to be exhausted from the colloid material at a higher rate than it can be absorbed by the absorptive band, releasing the pressure before said band is fully moistened, separating said band from the colloid material, drying said band, cooling the dried band to about the temperature of the crude colloid material, and repeating the aforesaid operations in cyclic sequence each time with a fresh charge of crude colloid material.

2. In a process of dehydrating colloid material, feeding crude colloid material onto a pervious endless belt adapted to absorb moisture, continuously moving said belt, applying pressure to said belt to initiate the exudation of liquid from the colloid material in contact therewith, gradually increasing the pressure against the colloid material on said belt to cause liquid to be expelled from the colloid material through said belt at a considerably higher rate than it can be absorbed by the absorptive belt, releasing the pressure before said belt is fully moistened, separating said belt from the colloid material, drying said belt by heating, cooling the dried belt to about the temperature of the crude material to be treated and repeating the aforesaid operations in cyclic sequence each time with a fresh charge of crude colloid material.

3. In a process of dehydrating colloid material, feeding crude colloid material onto a pervious endless belt adapted to absorb moisture, adding an absorbent powder to the colloid material on said band, applying pressure to said belt to initiate the exudation of liquid from the colloid material in contact with said powder and with said belt, gradually increasing the pressure against said colloid material to cause liquid to be expelled from the colloid material through said belt at a considerably higher rate than it can be absorbed by said belt and by said powder, releasing the pressure before said belt is fully moistened, separating said belt from the material thereon, drying said belt by heating, cooling the dried belt to about the temperature of the crude material to be treated, and repeating the aforesaid operations in cyclic sequence each time with a fresh charge of colloid material.

4. In a process of dehydrating colloid material, feeding crude colloid material onto a pervious endless belt of tanned fibrous material adapted to absorb moisture, continuously moving said belt, applying pressure to said belt to initiate the exudation of liquid from the colloid material in contact therewith, gradually increasing the pressure against the colloid material on said belt to cause liquid to be expelled from the colloid material through said belt at a considerably higher rate than it can be absorbed by the asorptive belt, releasing the pressure before said belt is fully moistened, separating said belt from the colloid material, charging said belt with a material having a coagulating effect on colloids, drying said belt and then cooling it to about the temperature of the crude material to be treated and repeating the aforesaid operations in cyclic sequence each time with a fresh charge of crude colloid material.

5. In a process of dehydrating colloid material, feeding crude colloid material onto an endless band adapted to absorb moisture, continuously moving said band, applying pressure to said band to initiate the exudation of liquid from the colloid material in contact therewith, increasing the pressure against said colloid material on said band to cause liquid to be expelled from the colloid material at a higher rate than it can be absorbed by the absorptive band, releasing the pressure before said band is fully moistened, separating said band from the colloid material by scraping, drying said band by heating, cooling the dried band to about the temperature of said material, and repeating the aforesaid operations in cyclic sequence each time with a fresh charge of colloid crude material.

6. In a process of dehydrating colloid material, continuously bringing crude colloid material into contact with a band adapted to absorb moisture, continuously moving said band with the material in contact therewith, applying pressure to said band to initiate the exudation of liquid from the material in contact therewith, increasing said pressure to cause liquid to be exhausted from the colloid material at a higher rate than it can be absorbed by the absorptive band, releasing the pressure before said band is fully moistened, separating said band from the colloid material, drying said band, cooling the dried band to about the temperature of the crude colloid material, and repeating the aforesaid operations in cyclic sequence each time with a fresh charge of crude colloid material.

MATHIEU VAN ROGGEN.
LEO ROBIN.